United States Patent [19]
Adams

[11] Patent Number: 5,978,750
[45] Date of Patent: Nov. 2, 1999

[54] METHOD OF AND AN APPARATUS FOR DETERMINING THE SURFACE CONDITION OF A WORKPIECE

[75] Inventor: Horst Adams, Nonnenhorn, Germany

[73] Assignee: Wagner International AG, Altstatten, Switzerland

[21] Appl. No.: 08/867,324

[22] Filed: Jun. 2, 1997

[30] Foreign Application Priority Data

Apr. 6, 1996 [DE] Germany .......................... 196 22 429

[51] Int. Cl.⁶ .................................................. G01B 5/28
[52] U.S. Cl. ......................... 702/168; 702/167; 356/357; 356/371
[58] Field of Search .................................. 702/168, 167; 356/357, 360, 354, 371, 376; 428/209, 935; 205/111

[56] References Cited

U.S. PATENT DOCUMENTS

| | | | |
|---|---|---|---|
| 5,398,113 | 3/1995 | De Groot | 356/360 |
| 5,402,234 | 3/1995 | Deck | 356/357 |
| 5,488,476 | 1/1996 | Mansfield et al. | 356/354 |
| 5,858,517 | 1/1999 | Tagusari | 428/209 |

FOREIGN PATENT DOCUMENTS

| | | | |
|---|---|---|---|
| 41 27 215 A1 | 2/1993 | Germany | G01N 21/55 |
| 42 30 068 A1 | 3/1994 | Germany | G01B 11/30 |

*Primary Examiner*—James P. Trammell
*Assistant Examiner*—Cuong H. Nguyen
*Attorney, Agent, or Firm*—Fenwick & West, LLP

[57] ABSTRACT

Apparatus and method of determining the surface condition of a workpiece, operate by measuring a roughness profile of the surface across a certain measuring distance, splitting up the roughness profile into wave frequencies and amplitudes associated with them, dividing the wave frequencies into wave frequency ranges, and determining the surface condition of the workpiece based on the amplitudes in the respective wave frequency ranges. The roughness profile may be understood as the superpositioning of harmonic oscillations having certain wavelengths and amplitudes. By subjecting them to a Fourier analysis, these harmonic oscillations are split up into their wave frequencies and associated amplitudes. Then wave frequency ranges are combined to form bands such that a high intensity in one of the bands each corresponds to a certain physical appearance of the surface. The invention thus provides an objective, calculable measure of the surface condition of a workpiece.

13 Claims, 2 Drawing Sheets

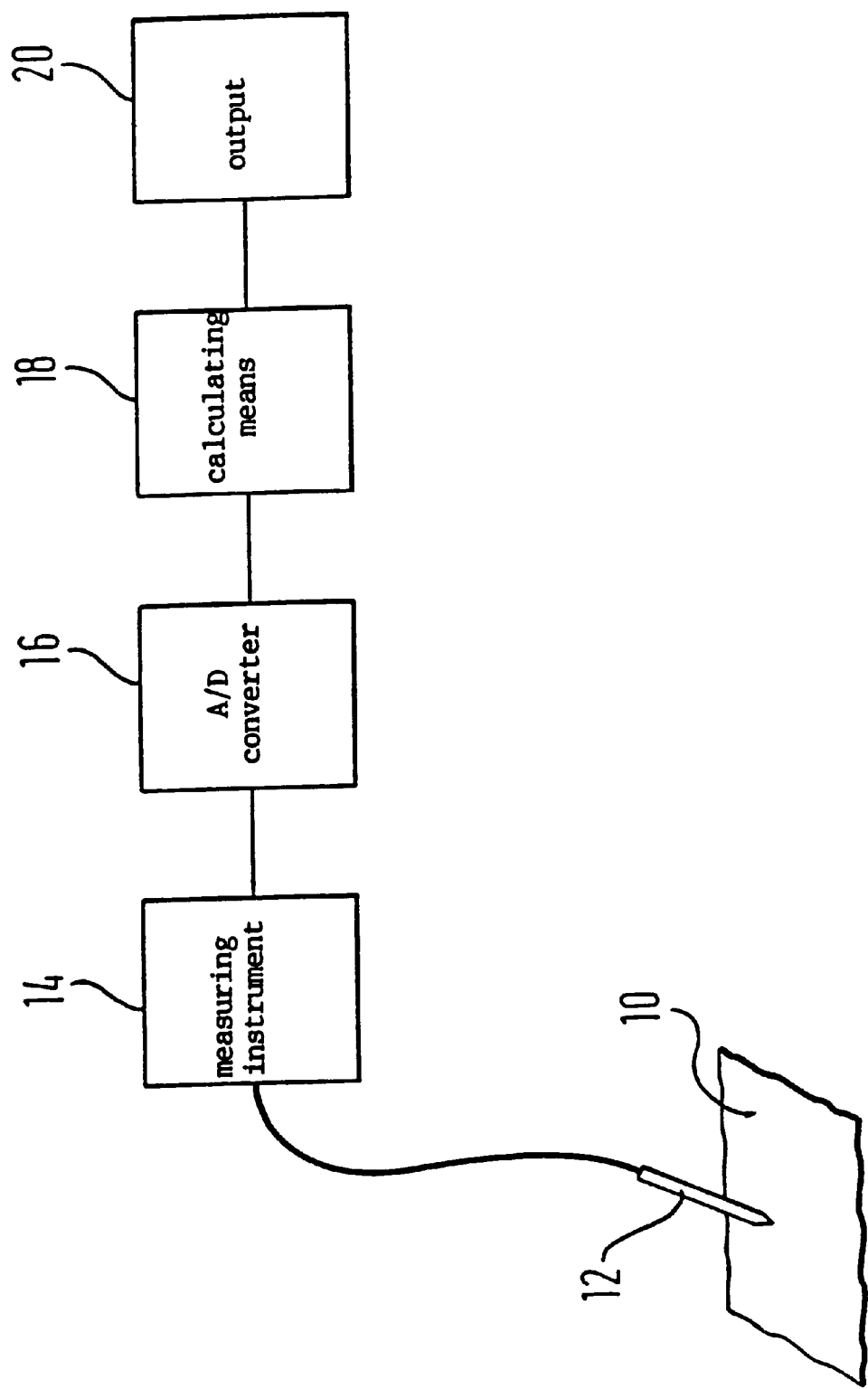

METHOD OF AND AN APPARATUS FOR DETERMINING THE SURFACE CONDITION OF A WORKPIECE

FIELD OF THE INVENTION

The instant invention relates to a method of and an apparatus for determining the condition of the surface of a workpiece.

BACKGROUND OF THE INVENTION

Objective criteria do not exist as yet for determining the quality, nature or, quite generally, the condition of a varnished or enameled workpiece surface, in other words a surface to which a lacquer or varnish coat has been applied. Such surfaces are simply examined visually by trained staff and then classified subjectively according to characteristics such as "orange peel skin", "cloudiness" or "unsteadiness". The characterization cannot be but inaccurate, as these "florid" terms themselves suggest.

The reason why this kind of surface examination is not reliable is due to the fact that it depends a lot on the personal impression and experience of the examining person. Such results can never be unambiguous because objective criteria are missing.

A device for measuring the "orange peel skin effect" or disturbance of the flow on surfaces is known from catalog 94/08 by Messrs. BYK-Gardner GmbH, of Geretsried, Germany and also from DE-A-41 27 215. The device simulates the visual observation of the surface. As with the eye, the wavy brightness pattern on the surface is scanned optically. A measuring instrument directs a light beam against the surface and measures the reflection. The resulting brightness profile is divided into long wave and short wave components, this long wave and short wave characterization serving as an indirect measure of analyzing the surface. The catalog is silent on the further processing of the measurement signals. It is a disadvantage of the method described that the measurement is performed by way of the reflection of light so that it is applicable only with reflecting surfaces. Surfaces having mat finishes cannot be characterized.

DE-A-41 30 068 describes an optical reflection measuring device which detects the intensity of light reflected from a surface and calculates the local frequency spectrum of the reflected intensities. A comparison of the local frequency spectrum, or meaningful parts thereof, with a theoretical or desired value is made in order to verify the surface roughness of a workpiece. The method described in this prior publication is not suitable for determining the physical appearance of a surface in respect of the effects specified above.

SUMMARY OF THE INVENTION

It is an object of the invention to provide a method for determining the surface condition of a workpiece by objective examination which renders quantifiable results. It is another object of the invention to provide an apparatus by which the surface of a workpiece can be examined objectively and the result of the examination is quantifiable.

The above objects are met by a method comprising the features as recited in claim 1 and by an apparatus which comprises the features of claim 9, respectively.

The method according to the invention essentially comprises the following steps: a roughness profile of the surface of the workpiece is prepared for a certain measuring distance, for example, by sensing the workpiece surface in per se known manner by means of a feeler head. The roughness profile thus recorded then is digitized. Alternatively, a discrete series of readings of wave crest values of the surface profile may be taken to begin with.

Subsequently, the roughness profile is split up into harmonic oscillations having certain wavelengths and associated amplitudes The roughness profile may be considered to be the superpositioning of harmonic oscillations having certain wavelengths and amplitudes. By Fourier analysis, these harmonic oscillations are separated into their wave frequencies corresponding to the wavelengths, or (less customary) wave numbers, and amplitudes associated with them.

In the present context the term "wave frequency" as used for the surface profile is not related to time but rather to space, namely to the number of waves per unit length of the measuring distance. Thus the unit employed to designate the "wave frequency" for purposes of the instant application is 1/mm, i.e. one oscillation or wave per millimeter. It should be noted that the wavelength $\lambda$ and the wave frequency $v$ fulfill the following relationship: $\lambda \cdot v =$ constant, which allows easy conversion from wave lengths into wave frequencies and vice versa. The description below and the claims relate to the calculation and processing of wave frequencies. However, splitting up the curve of measurements taken of the roughness profile into respective wavelengths and associated amplitudes will provide the same sort of characterization of the nature of the workpiece surface.

The roughness profile measured preferably is split up by Fourier analysis into the wave frequencies and the associated amplitudes. The Fourier coefficients can be calculated by fast Fourier transform, for instance.

The wave frequencies or wave lengths then are classified into wave frequency ranges or wavelength ranges or bands and the condition of the workpiece surface is determined as a function of the amplitudes in the respective wave frequency ranges or wavelength ranges. An amplitude mean value may be established for each wave frequency range or wavelength range.

The division into wave frequency bands or wavelength bands at first is arbitrary. Yet it should be selected in such a way that a high intensity (or mean amplitude) in one of the bands always corresponds to a certain physical appearance of the surface. In this manner the method according to the invention provides a clear magnitude to be determined objectively as a measure of assessing the surface condition.

In practice, the division of the wave frequency ranges, wavelength ranges, and their coordination with the subjective impressions of the surface condition is done empirically but, ultimately, some standardization of the wave frequency ranges or wavelength ranges and intensity values should be provided in order for a generally binding scale to be obtained.

The invention further provides an apparatus for determining the surface condition of a workpiece, which apparatus comprises a roughness measuring instrument for recording a roughness profile of the surface across a certain measuring distance, a calculating means for deriving wave frequencies or wavelengths and associated amplitudes from the roughness profile measured, and a coordinating means for dividing the wave frequencies or wavelengths into wave frequency ranges or wavelength ranges, respectively, and for determining the surface condition of the workpiece based on the amplitudes in the corresponding wave frequency ranges or wavelength ranges, respectively. The roughness measuring instrument preferably comprises a sensor means for recording a continuous curve of the roughness profile being measured and an analog/digital converter for converting the continuous curve into discrete digital values. The sensor means operates, for instance, with a feeler tip as known in the art of surface examination.

It is especially advantageous to calculate the wave frequencies which correspond to the wavelengths and the associated amplitudes by way of a Fourier analysis of the roughness profile.

The method and apparatus according to the invention are especially well suited for use with varnished workpiece surfaces showing repetitive undulating irregularities in the varnish coat. However, they may be applied also for examining workpieces which are coated differently or which have been machined, for example, by milling, filing, etc.

BRIEF DESCRIPTION OF THE DRAWING

The invention will be described further, by way of example, with reference to the accompanying drawings, in which:

FIG. 4 is a schematic block diagram of the apparatus according to the invention.

DESCRIPTION OF THE PREFERRED EMBODIMENT

Figure 1:
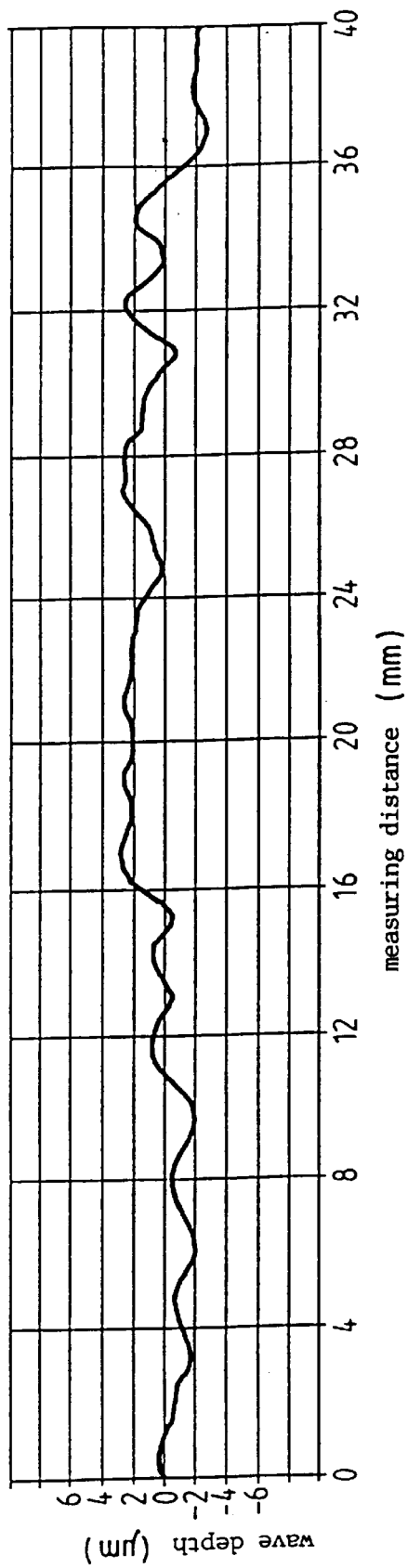
FIG. 1 shows a graph of a roughness profile of a workpiece surface.

FIG. 1 shows the continuous roughness profile of a varnished surface across a 40 mm measuring distance. The wave depth lies between −3 μm and +3 μm, the zero line corresponding to a completely smooth surface at the desired level. In principle, any roughness measuring device, e.g. a feeler tip may be used for drawing up the roughness profile. A feeler tip is guided over the surface of the workpiece so as to sense it and record the roughness profile. Alternatively, an optical instrument or an ultrasonic means, for example, could be employed for sensing the surface of the workpiece.

The curve of measured values illustrated in FIG. 1 is digitized for further processing, in other words it is split up into individual, discrete points of measurement. Alternatively, the roughness profile may be recorded from the very beginning in the form of discrete points of measurement. The discrete measured values of the wave depth across the measuring distance are subjected to Fourier analysis in order to provide a Fourier series of the roughness profile.

Figure 2:
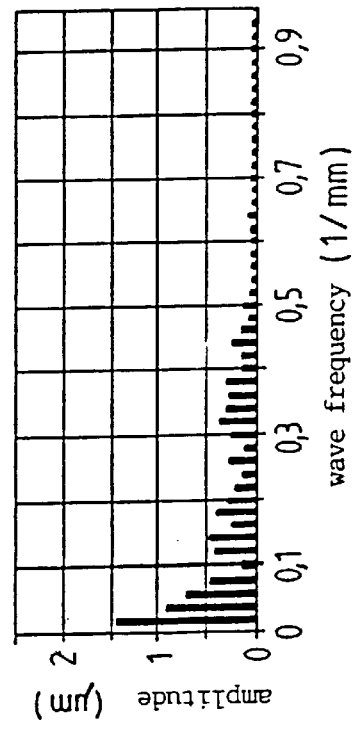
FIG. 2 is a graphic presentation of the result of the Fourier analysis of the roughness profile illustrated in FIG. 1.

The result of this analysis is demonstrated in FIG. 2 which indicates the intensity or amplitude values for certain wave frequencies.

In the Fourier analysis, the roughness profile is treated like a periodic time function. Yet the surface profile of the workpiece does not vary over time but instead across the measuring distance. Therefore, the unit of the wave frequency in the context of the instant application is not 1/s but instead 1/mm. In spite of that, however, the same mathematical inter-relationship and the same rules apply to the Fourier analysis when used with the instant invention as with the Fourier analysis of a time function which, as such, is known to those skilled in the art. As the Fourier analysis, in the present case, is performed on the basis of a discrete system of points rather than a continuous curve it is referred to here as a numerical harmonic analysis. The Fourier coefficients which correspond to the amplitude values or the intensity values preferably are calculated by the fast Fourier transform (FFT) method.

Figure 3:
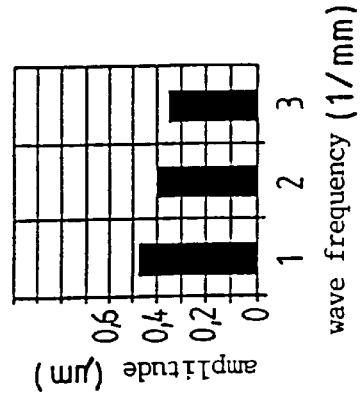
FIG. 3 is an illustration of the wave frequency bands, starting from the result of the Fourier analysis shown in FIG. 2.

FIG. 2 indicates intensity values or amplitudes of the surface waves for certain wave frequencies obtained by Fourier analysis. FIG. 3 shows wave frequency ranges or wave frequency bands which may be coordinated with certain impressions of the workpiece surface. For each wave frequency band, the mean value of the amplitudes contained in it is calculated. Associating the wave frequency ranges and thus the corresponding wavelength ranges, as explained above, with the corresponding subjective impressions, in accordance with the invention, permits a numerical characterization of a surface as regards its optical appearance. At the present time, for example, three wave frequency bands are provided of which the significance is as explained below:

| | wavelength (mm) | wave frequency (1/mm) | meaning |
|---|---|---|---|
| band 1 | 0.2–2 | 0.5 k–5 k | orange peel skin |
| band 2 | 2–100 | 0.1 k–0.5 k | unsteady surface |
| band 3 | >100 | <0.1 k | cloudiness | k being a constant. It should be noted that this division merely serves the purpose of explaining the invention and is by no means binding.

A characterization vector may be formed for each surface, the elements of such vector corresponding to the standardized amplitudes in the respective wave frequency bands. Accordingly, an absolutely smooth surface would be represented as (0,0,0). Assuming that a (standardized) maximum amplitude equals 10, then a surface with great resemblance to an orange peel skin, for instance, would be represented as (10,0,0), whereas a surface with little resemblance to an orange peel skin and having a rather steady course but severe cloudiness in great blotches would be represented as (2,2, 10).

Based on his or her experience, anyone skilled in this art can accomplish the division into frequency bands and the evaluation on the basis of the (mean) amplitude in the respective bands, after having carried out a relatively small number of test measurements. Ultimately, however, standardization of the wavelength bands is aimed at in order to be able to come to a binding conclusion as to the condition of a surface.

Thus it is not the particular coordination between wave frequency ranges and surface conditions which is an essential feature of the instant invention, but rather the teaching to split up the measured roughness values by Fourier analysis into wave frequencies and associated amplitude values and, subsequently, divide the wave frequencies into wave frequency bands or ranges which permit a numerical (quantifiable) characterization to be made of the optical properties of the surface.

FIG. 4 is a diagrammatic presentation of an apparatus for determining the condition of a workpiece surface 10. A feeler tip 12 is guided across the surface 10, and it transmits electrical signals representative of the respective waviness of the surface 10 to a measuring instrument 14 which forms a curve of measured values on this basis, as illustrated in FIG. 1. This curve representing the surface roughness or waviness is applied to an analog/digital converter 16 which splits up the curve into individual, discrete points of measurement for application to a calculating means 18. The calculating means 18 performs a Fourier analysis of the measured values, i. e. it splits up the roughness profile into a series of harmonic oscillations having certain wave frequencies and amplitudes. Moreover, in the calculating means 18, the individual elements of the Fourier series are combined to form wave frequency bands. Each wave frequency band has an amplitude which corresponds to the mean amplitude of the individual wave frequencies included in the band. The result of this processing, in other words the amplitudes gathered in wave frequency bands or the Fourier coefficients then may either be displayed by way of an output means 20 or passed on to a downstream processor (not shown) for further processing.

The invention may be modified and developed further in many different ways obvious to those skilled in the art, as regards the sensing of the roughness profile, the particular realization of the Fourier analysis, the classification into wave frequency ranges, the standardization of these wave frequency ranges as well as the associated amplitudes, the output and further processing of the result of the Fourier analysis. It may be provided that the surface condition is determined by means of a division into wave frequency ranges or—equivalently—into wavelength ranges since the wave frequency $\lambda$ and the wavelength $v$ are quantities which correpond to each other and for which the relationship $\lambda \cdot v = $ constant holds.

For even better characterization of the surface condition, a plurality of measuring distances may be laid in parallel and/or orthogonal with respect to each other across the workpiece surface.

The features defined in the above specification, in the figures and claims may be essential, either individually or in any combination, to the realization of the invention.

What we claim is:

1. A computer-implemented method of quantifying characteristics of a surface condition of a workpiece, comprising the following steps:
   (a) measuring a roughness profile of the surface across a certain measuring distance,
   (b) splitting up the roughness profile into wavelengths and amplitudes associated with them,
   (c) arranging the wavelengths into wavelength ranges, and
   (d) determining a characteristic of the surface condition of the workpiece based on the amplitude mean values in the respective wavelength ranges.

2. The method as claimed in claim 1, wherein a continuous curve of the roughness profile is recorded while the roughness profile is being measured, and subsequently the curve is digitized to obtain discrete measured values.

3. The method as claimed in claim 1, wherein discrete measured values of the roughness profile are recorded during the measurement of the roughness profile.

4. The method as claimed in claim 1, wherein the measured roughness profile is split up into wave frequencies corresponding to the wavelengths and into associated amplitudes by applying a Fourier analysis.

5. The method as claimed in claim 4, wherein the Fourier coefficients are calculated by fast Fourier transform.

6. The method as claimed in claim 1, wherein a vector is formed for the measuring distance, the components of the vector each corresponding to the amplitude mean values of the wavelength ranges.

7. The method as claimed in claim 1, wherein the amplitude mean values are standardized.

8. The method as claimed in claim 1, wherein the surface condition of the workpiece is determined from wave frequencies of the associated wavelengths and from wave frequency ranges of the associated wavelength ranges.

9. A computer-implemented apparatus for determining a surface condition of a workpiece, comprising:
   (a) a roughness measuring instrument for recording a roughness profile of the surface across a certain measuring distance,
   (b) a calculating means for deriving wavelengths and amplitudes associated with them from the roughness profile measured, and
   (c) a coordinating means for arranging the wavelengths into wavelength ranges and for determining the surface condition of the workpiece based on the amplitude mean values in the respective wavelength ranges.

10. The apparatus as claimed in claim 9, wherein the roughness measuring instrument comprises a sensor means (12) adapted to record a continuous curve of the roughness profile being measured and an analog/digital converter (16) to convert the continuous curve into discrete measured values.

11. The apparatus as claimed in claim 10, wherein the sensor means comprises a feeler tip (12).

12. The apparatus as claimed in claim 9, wherein the calculating means (18) subject the roughness profile to a Fourier analysis to calculate the wave frequencies corresponding to the wavelengths and the associated amplitudes.

13. The method according to claim 1 in which arranging includes combining respective wavelengths in different wavelength ranges and determining an amplitude mean value for each wavelength range.

\* \* \* \* \*